(12) United States Patent
Rajapakse

(10) Patent No.: US 9,479,584 B2
(45) Date of Patent: *Oct. 25, 2016

(54) SYNCHRONOUS MEDIA RENDERING OF DEMUXED MEDIA COMPONENTS ACROSS MULTIPLE DEVICES

(71) Applicant: Blackfire Research Corporation, San Francisco, CA (US)

(72) Inventor: Ravi U. Rajapakse, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,644

(22) Filed: Jun. 29, 2015

(65) Prior Publication Data

US 2015/0304418 A1    Oct. 22, 2015

Related U.S. Application Data

(63) Continuation of application No. 13/561,031, filed on Jul. 28, 2012, now Pat. No. 9,071,418.

(60) Provisional application No. 61/512,924, filed on Jul. 29, 2011.

(51) Int. Cl.
| | |
|---|---|
| *H04N 21/238* | (2011.01) |
| *H04L 29/08* | (2006.01) |
| *H04N 21/20* | (2011.01) |
| *H04N 21/40* | (2011.01) |
| *H04N 13/00* | (2006.01) |
| *H04L 29/06* | (2006.01) |
| *H04N 21/438* | (2011.01) |
| *H04L 1/08* | (2006.01) |
| *H04L 12/26* | (2006.01) |
| *H04L 12/713* | (2013.01) |

(52) U.S. Cl.
CPC ............ *H04L 67/1095* (2013.01); *H04L 1/08* (2013.01); *H04L 29/06469* (2013.01); *H04L 43/0829* (2013.01); *H04L 45/586* (2013.01); *H04L 65/4076* (2013.01); *H04L 65/601* (2013.01); *H04L 65/608* (2013.01); *H04L 65/80* (2013.01); *H04L 67/108* (2013.01); *H04L 69/163* (2013.01); *H04L 69/166* (2013.01); *H04L 69/324* (2013.01); *H04N 13/0048* (2013.01); *H04N 13/0059* (2013.01); *H04N 21/20* (2013.01); *H04N 21/238* (2013.01); *H04N 21/40* (2013.01); *H04N 21/438* (2013.01)

(58) Field of Classification Search
CPC ..................... H04N 13/0048; H04N 13/0059; H04N 21/20; H04N 21/40; H04N 21/65; H04N 21/238; H04N 21/438; H04L 29/06469
See application file for complete search history.

(56) References Cited

U.S. PATENT DOCUMENTS

| 2003/0004992 A1* | 1/2003 | Matsui | G11B 20/10527 715/201 |
| 2012/0131218 A1* | 5/2012 | Putterman | H04N 21/4402 709/231 |

(Continued)

*Primary Examiner* — Le H Luu
(74) *Attorney, Agent, or Firm* — Galvin Patent Law LLC; Brian R. Galvin

(57) ABSTRACT

Some media applications use media containers, media files or media streams that contain multiple media components in it and require that each component of media be sent to different destinations tailored for rendering a particular type of media component. Furthermore there may be multiple destinations for a particular media component type. For example an application might use a media file with one video and one stereo audio stream and want to send this to two video rendering devices and four stereo audio devices. This invention describes a system for rendering these media components synchronously on multiple devices by demultiplexing the media into media sub components at one destination, sending the components to all destinations and synchronizing the rendering at each device.

5 Claims, 12 Drawing Sheets

(56) References Cited

U.S. PATENT DOCUMENTS

| | | | | |
|---|---|---|---|---|
| 2012/0173383 A1* | 7/2012 | Badawiyeh | ............ | G06Q 50/01 705/26.7 |
| 2012/0239779 A1* | 9/2012 | Einarsson | ......... | H04L 29/06027 709/217 |
| 2012/0268553 A1* | 10/2012 | Talukder | ............ | H04L 12/1818 348/14.08 |
| 2012/0311177 A1* | 12/2012 | Visharam | ................ | G06F 15/16 709/233 |
| 2012/0311723 A1* | 12/2012 | Britt, Jr. | ............ | G06F 17/30023 726/28 |
| 2012/0317492 A1* | 12/2012 | Sheeder | .................... | G06F 3/01 715/738 |
| 2013/0304916 A1* | 11/2013 | Hodapp | ................. | H04N 21/20 709/224 |
| 2014/0047123 A1* | 2/2014 | Oyman | .................. | H04N 13/00 709/231 |
| 2014/0055559 A1* | 2/2014 | Huang | .................. | G06T 15/005 348/42 |

\* cited by examiner

SYNCHRONOUS MEDIA RENDERING OF DEMUXED MEDIA COMPONENTS ACROSS MULTIPLE DEVICES

CROSS-REFERENCE TO RELATED APPLICATIONS

This application is a continuation of U.S. patent application Ser. No. 13/561,031 titled "SYNCHRONOUS MEDIA RENDERING OF DEMUXED MEDIA COMPONENTS ACROSS MULTIPLE DEVICES" and filed on Jul. 28, 2012, which claims priority under 35 U.S.C. §119(e) to U.S. Provisional Patent Application Ser. No. 61/512,924, filed Jul. 29, 2011, entitled "Techniques for broadcasting media over a local network to multiple destinations" the entire specifications of each of which are incorporated herein by reference.

BACKGROUND OF THE INVENTION

Field of the Invention

The present invention is directed to network communications and to digital media sourcing, transmission and rendering.

SUMMARY OF THE INVENTION

The present invention is directed to media applications that use media containers, media files or media streams that contain multiple types of media in it and that require each type of media to be sent to different destinations tailored for rendering that media type. Furthermore, these applications may have multiple destinations for a particular media type. For example an application might use a media file with one video and one stereo

BRIEF DESCRIPTION OF THE DRAWING FIGURES

Figure 1:
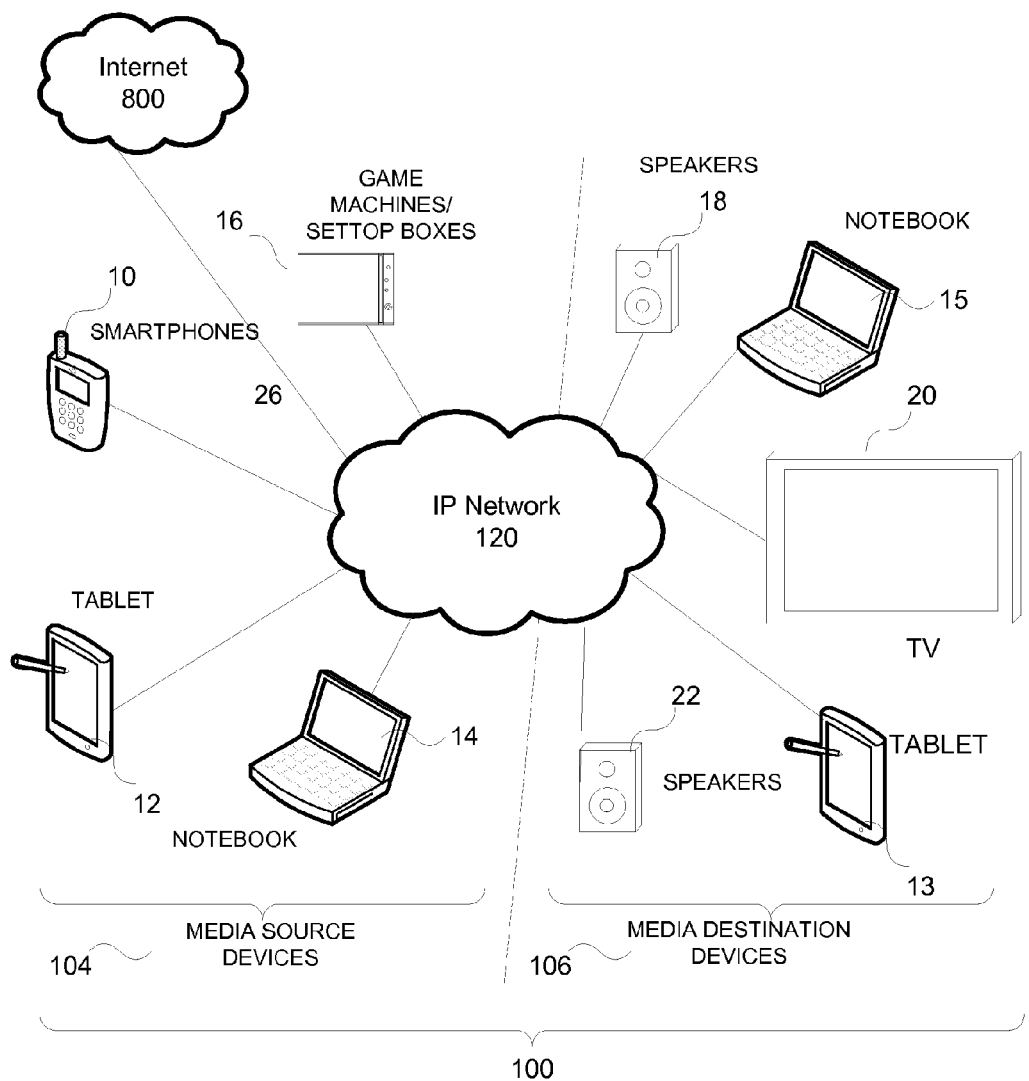
FIG. 1 illustrates an overview of the devices in a system in accordance with one embodiment.

Today there are many forms of digital media, many types of digital media sources, many types of digital media playback (rendering) systems and lots of ways of connecting media sources to media playback systems.

Digital media, hereafter referred to as media, comes in many forms, formats and containers, including Digital Video Disks, media files and media streams. The media contents can be audio, video, images or metadata media components and various combinations of each. For example a popular audio format is known as MP3 and a popular video format is H264. MP3 is an audio-specific media format that was designed by the Moving Picture Experts Group (MPEG) as part of its MPEG-1 standard and later extended in the MPEG-2 standard. H264 is astandard developed by the International Organization for Standardization (ISO)/International Electrotechnical Commission (IEC) joint working group, the Moving Picture Experts Group (MPEG). Movies are typically multimedia formats with a video and multiple audio channels in it. For example a 5.1 movie contains 1 video channel (media component) and 6 audio channels (audio components). 5.1 is the common name for six channel surround sound multichannel audio systems.

Digital media sources include media devices such as Digital Video Disk players, Blu-ray players, computer and mobile devices, and internet based "cloud" media services. Blu-ray Disc (BD) is an optical disc storage medium developed by the Blu-ray Disc Association. Internet based media services include services such as Netflix™ and Spotify™. Netflix is a media service and trademark of Netflix Inc. Spotify is a media service and trademark of Spotify Ltd. Digital media playback (media rendering destinations) systems include computer based devices, laptops and smartphones, as well as network audio and video devices. A SmartTV is an example of a digital media rendering device that can play media from an internet (cloud) based media service such as Netflix™. A SmartTV, which is also sometimes referred to as "Connected TV" or "Hybrid TV", is used to describe the integration of the internet and Web features into modern television sets and set-top boxes, as well as the technological convergence between computers and these television sets I set-top boxes. An internet radio device is another example of a digital media rendering device.

The connectivity between these media sources and devices is varied, but is evolving over time towards network based connectivity using IP protocols. This is because IP connectivity is convenient, ubiquitous and cheap. IP stands for Internet Protocol. An IP networked device is a device that adheres to the Internet Protocol suite standard. The Internet Protocol suite is defined by the Internet Engineering Task Force [IETF] standards body. The Internet is a global system of interconnected computer networks that use the standard Internet Protocol (IP) suite.

IP networks come in many forms; the most prevalent being Ethernet based wired IP networking. Ethernet is a family of computer networking technologies for local area networks (LANs) that is standardized as IEEE (Institute of Electrical and Electronics Engineers) Standard 802.3. In recent years with the prevalence of mobile computing devices, Wi-Fi has become the most popular means for connecting network devices wirelessly. Wi-Fi is a trademark of the Wi-Fi Alliance and a brand name for products using the IEEE 802.11 family of standards. A Wi-Fi network is a type of IP network.

The convenience and benefits of IP networking means that all of these media sources and playback systems, if not already network enabled, are becoming network enabled. Many Blu-ray players now have Ethernet and Wi-Fi network connectivity. Today most higher-end TVs are smart TVs that have network capability. Similarly audio play back devices and even radios are network and internet enabled.

Mobile devices, such as mobile phones, tablets, readers, notebooks etc, are able to receive and store media and have powerful media (audio and video) capabilities and are connected to the internet via cell phone data services or broadband links, such as Wi-Fi that are high bandwidth and can access online media services that have wide and deep content.

The use cases or applications of these various forms of digital media, media services and media sources and playback systems have been evolving. Initially it was enough to connect a media source to a media destination over an IP network. This is widely used today with Internet based media source services, such as Netflix and a computer as a media destination. Users watch Netflix movies streamed over a wired IP network (the internet) to a computer. This is a case of a single point (one IP source) to single point (one IP destination) connection over a wired IP network. Even though the Netflix media service may send the same media to multiple households, each of these is a single point to single point connection TCP/IP connection. A further evolution of this is to use a wireless, Wi-Fi connection, instead of a wired Ethernet connection. This is still a single point to single point connection.

The applications targeted in this invention are for a further extension of the above use cases where the media source connects to multiple destinations rather than a single destination. These are single point (one IP source) to multi point (multiple IP destinations) applications. An example would be where a user is playing a 5.1 movie media file to a wireless video playback device and 6 independent wireless audio destinations making up a full 5.1 surround sound system. In this case the media is going from one media source to 7 media destinations simultaneously. In another example, a user is playing music from one media source to 6 audio playback systems placed around the home in 6 different rooms.

In both of these cases, it is necessary to play (render) the media at all destinations time synchronously. Furthermore, it is necessary to limit the use of resources at the media source, such as keeping memory use to a minimum. In addition, it is necessary with multiple devices receiving media to manage network bandwidth efficiently.

In some applications, the video media may be rendered through one path, for example a specialized hardware path, and the audio may be rendered through a different network path. When different media components of the same media are going through different paths, it is necessary to keep path delays (path latency) to a minimum. This is necessary to keep the different media components time synchronized. In these applications, keeping media network transport latencies to a minimum is important.

Furthermore, when the network is Wi-Fi, network packet losses can be high and it is necessary to mitigate these in order to deliver uninterrupted playback.

The general structure of these application are that of multiple IP networked media source devices choosing, connecting and playing media to one or more IP networked media playback devices over an IP communication network.

FIG. 1 shows an exemplary system 100 having multiple media source devices 104 and multiple media destination devices 106.

Figure 2:
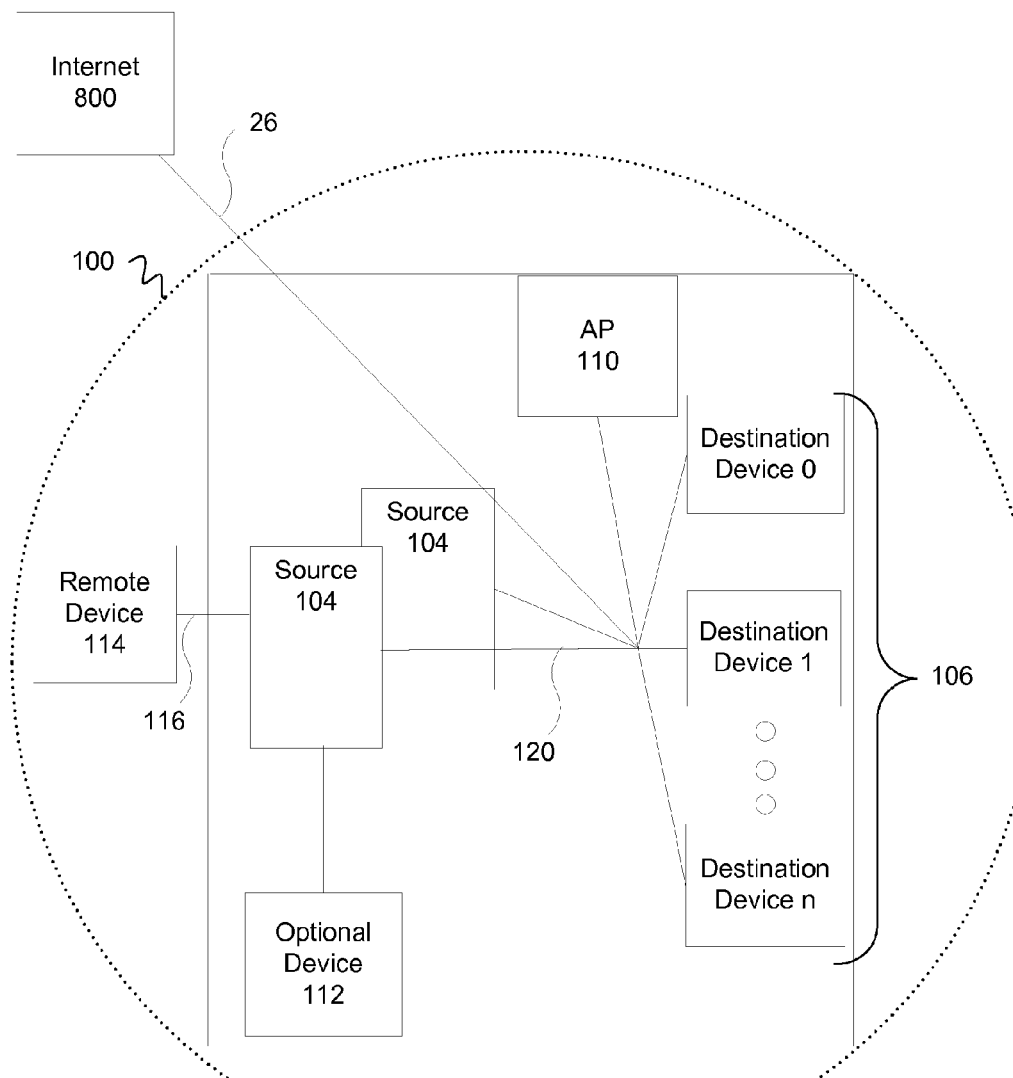
FIG. 2 illustrates a schematic of the devices in a system in accordance with one embodiment.

FIG. 2 is a schematic diagram of such a media system 100 with one or more IP network-enabled media source devices 104 and one or more IP network enabled media destination devices 106 connected via an IP network 120.

Referring to both FIG. 1 and FIG. 2, a media source device 104 can be any variety of computing devices that can originate digital media including computers (e.g. desktop, notebook 14, tablet 12, handheld), mobile devices (e.g. smart phone 10, electronic book reader, organizer devices), as well as set-top boxes and game machines 16. The media is any form of digital media, including audio or video, images, data, and/or Meta data.

Media destination devices 106 are devices that can receive digital media over an IP network 120 and play this media. This includes IP-enabled audio and/or video and/or imaging devices that can render audio or video or images or combinations of these at the same time. Media destination devices 106 include computers (e.g. desktop, notebook 15, tablet 13, handheld), mobile devices (e.g. smartphones, tablets, notebooks 15), network enabled TVs 20, network enabled audio devices 18, 22. If the media is audio, playing the media means rendering the audio such that a user can listen to the audio. If the media is video, playing means rendering the video such that a user can view the media. If the media includes both audio and video, it means rendering both the audio and the video. If the media is images, playing means displaying these images on a screen. In this description, media destination devices 106 may also be referred to as media renderers or combinations of these terms.

In the media environment 100 of the present invention, each media source 104 can send its media to a selected set of media destination devices 106 for playback.

The network 120 and all networks used and described in this invention to connect all devices, including the media sources 104 with the media destinations 106 may be any network that supports an IP protocol. This includes any wired IP connectivity mechanism including Ethernet if wired and if wireless it includes any wireless IP connectivity mechanism including Wi-Fi. If this 120 is a Wi-Fi network, then the network 120 may include a Wi-Fi access point (AP) or Wi-Fi router 110 that manages the network in infrastructure mode. Alternatively, the network 120 may be using Wi-Fi Direct (Wi-Fi Direct is a standard of the Wi-Fi Alliance), in which case the AP 110 may not be present. The IP network 120 may also be connected to the internet 800 through a wide area network connection 26. The source 104 may also have a remote device 114 associated with it such as a remote control device connected via an IP or other communication link 116. In addition the source 104 or network 120 may have additional optional devices 112 such as a NAS (Network Attached Storage) device that provides media.

IP networks can use several different types of messaging including unicast, multicast and broadcast messaging. Messaging being the sending of IP packets.

Unicast messaging is a type of Internet Protocol transmission in which information is sent from only one sender to only one receiver. In other words, Unicast transmission is a one-to-one node transmission between two nodes only. In unicasting each outgoing packet has a unicast destination address, which means it is destined for a particular destination that has that address. All other destinations that may hear that packet ignore the packet, if the packet's destination address is not the same as that destination's address. Broadcast is a type of Internet Protocol transmission in which information is sent from just one computer, but is received by all the computers connected on the network. This would mean that every time a computer or a node transmits a 'Broadcast' packet, all the other computers can receive that information packet. Multicast is a type of Internet Protocol transmission or communication in which there may be more than one sender and the information sent is meant for a set of receivers that have joined a multicast group, the set of receivers possibly being a subset of all the receivers. In multicasting, each multicast packet is addressed to a multicast address. This address is a group address. Any destination can subscribe to the address and therefore can listen and receive packets sent to the multicast address that it subscribed to. The benefit of multicasting is that a single multicast packet sent can be received by multiple destinations. This saves network traffic if the same packet needs to be sent to multiple destinations. When the same data needs to be sent to multiple IP destinations generally, Broadcasting or Multicasting, rather than Unicasting, provides the most efficient use of the network.

In this description the terms Broadcast and Multicast may be used. In both Broadcasting and Multicasting, when messages are sent, they are received by multiple destinations. Therefore in the present specification, the terms Broadcast and Multicast may be used interchangeably to refer to one packet being received by multiple destinations. In some cases this description only says the media is sent or transmitted without specifying whether it is broadcast, multicast or unicast. In this case, it means any one of these methods may be used for sending or transmitting the media.

In this description, the terms Message and Packet are often used and may be used interchangeably. A Packet is a data set to be sent or received on an Internet Protocol network. The Packet may or may not be the same as an 'Internet Protocol Packet'. A Message refers to the logical information contained in such a packet. In this description, the term Segment may also be used to refer to a data set. A data set is a set of bytes of data. Data may be any type of data, including media or control or informational data. In this description the term data and packet may also be used interchangeable depending on context. Packet refers to a data set and data refers to data in general.

Many IP protocols are accessed from software programs via a Socket application programming interface. This Socket interface is defined as part of the POSIX standard. POSIX is an acronym for "Portable Operating System Interface", which is a family of standards specified by the IEEE for maintaining compatibility between operating systems.

Currently when the same media data needs to be sent to multiple network destinations, the general technique for doing so is to use data multicasting to the multiple destinations that need to receive the data.

In such a system the media is multicast to all the destinations and it is up to each destination to attempt to render the media appropriately. If during rendering there is an error where a renderer does not receive new media data or does not receive it correctly, the renderer may render erroneous data and then attempt to recover and continue correct media rendering from the point after the error when correct data is received. For example, during rendering of a H264 stream, if there is an incidental data drop out, the displayed image may pixilate briefly and then recover.

In the applications envisioned here, there is a need to send media from a source to multiple media devices, such as TV and speakers in the same listening and viewing space. Furthermore there is a need to send this media over a wireless network such as Wi-Fi.

For these applications, this means all of the media rendering devices, such as speakers, that are in the same listening or viewing zone, need to be precisely synchronized to each other, so the listener and/or viewer does not discern any unintended media experience.

Secondly, because the media is transported over wireless, there is a very high likely hood of a media error, where the media is not received at each destination reliably or uniformly. If using broadcast or multicasts to send packets, the same broadcast or multi cast packet, may be received at one destination but not received/heard by another destination.

In order to synchronize the rendering of all media destinations, this invention uses a technique as described in U.S. patent application Ser. No. 11/627,957.

In this invention, in order to broadcast media over a Wi-Fi network, it is first necessary to recognize that broadcast or multicast media will not be received at all destinations uniformly. Some destinations will receive a multicast packet, while others will not.

IP networks were first designed to operate over wired networks. By design, the packet communications on these networks were 'best effort'. This means any packet transmitted on the network may not be received by the intended destination. This is most often due to a collision, where another device starts to communicate at the same moment as the device of interest, thereby causing a collision. Another method of loss would be the devices in the network path, such as routers, simply dropping the packet, for example due to the lack of buffer space. Other reasons for loss could be that the wired line is simply noisy and the packet transmission got corrupted, though this is rare for the wired case vs. the wireless case.

In all these wired situations, it is generally the case, that if the transmission, for example a multicast message, was received by one device on a 'subnet' or wire, all the other devices on the same 'wire' or subnet also receive the transmission correctly. This is because in the wired case, the noise or interference situation of a device on one part of the wire is not so different from the noise situation at another part of the wire. If the wired devices are connected via a switch rather than a hub, the same issues are true, the amount of noise or interference is minimal.

Multiple Media Component Demultiplexing

Figure 3:
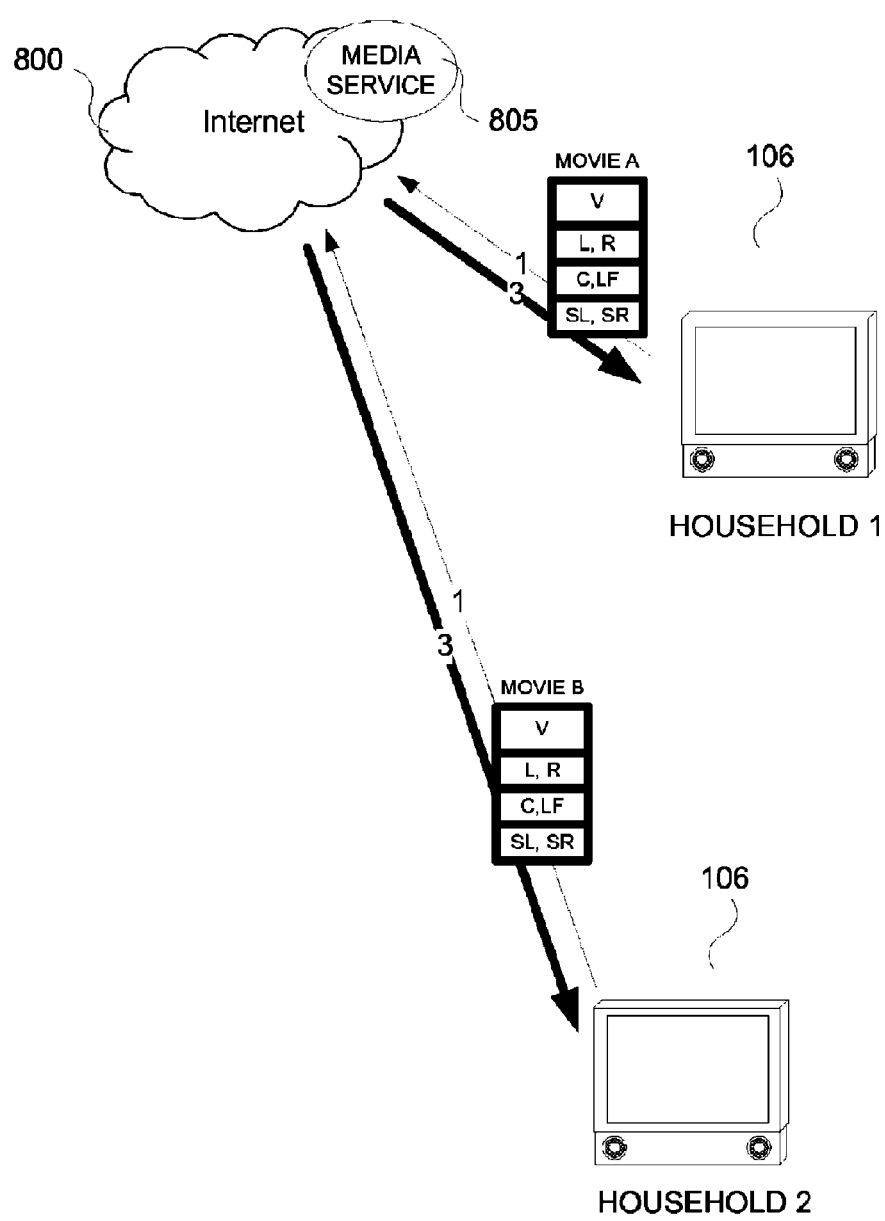
FIG. 3 illustrates a typical architecture for an internet media service sending media to multiple households.

Currently there are many media applications such as shown in FIG. 3 where a media service 805 on the internet 800, such as Netflix, streams media to multiple media rendering destination devices 106 in multiple households. The destination devices are networked via an IP network to the internet 800. The media stream may have multiple, time related, media components, such as video and multi-channel audio (L—Left, R—Right, C—Center, LP—Low Frequency, SL—Surround Left, SR—Surround right) in it, and all such media components are sent to one network addressable destination device 106. Since all the time related media components are being rendered on the same destination device 106, the mechanism for synchronous rendering of these components is local to the destination device 106. Each media stream sent to each household is unrelated to the stream sent to the other households. Furthermore, even if the same media is being sent to each household, since the media will be traversing different physical subnets in each household, there is no duplicate media traffic within the household subnet.

Figure 4:
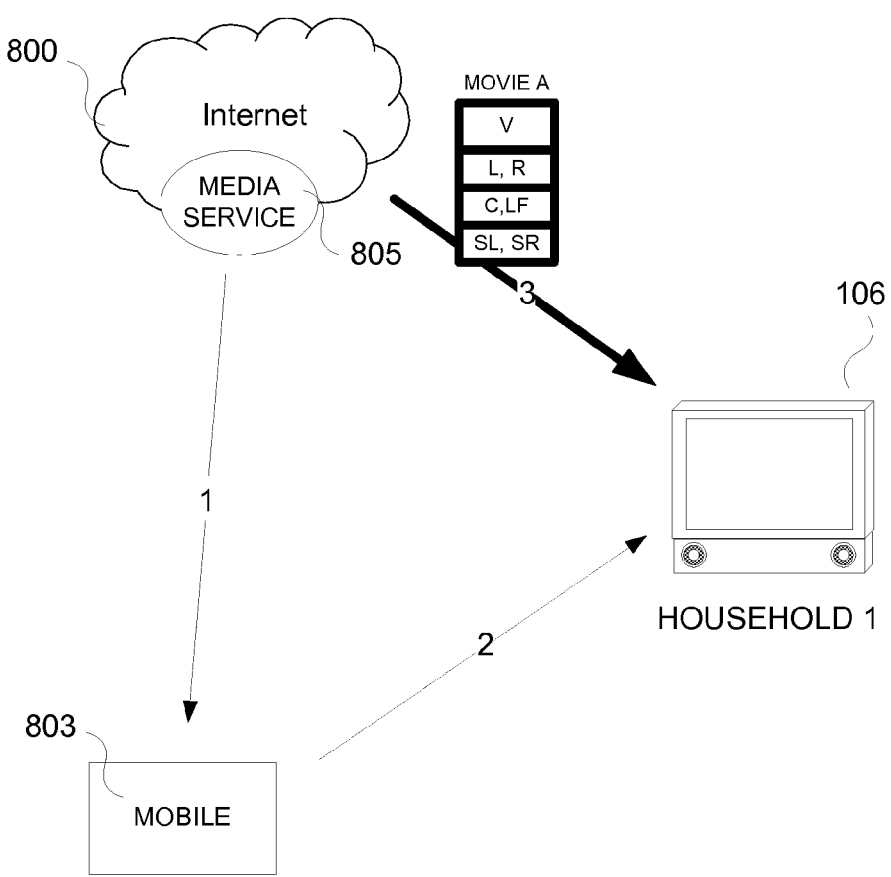
FIG. 4 illustrates the use of a mobile device to select the media to be played by a destination device.

FIG. 4 shows another common scenario, where the user of the media in the household uses a mobile device 803 to select 1 the media to be rendered on the destination device 106 and instructs 2 the destination device to receive the media directly 3 from the media service 805 on the internet 800 and render it on the destination device 106. As mention above, since all the media components in the media are being rendered on the same destination device, all media rendering synchronization issues are local to the destination device 106.

Figure 5:
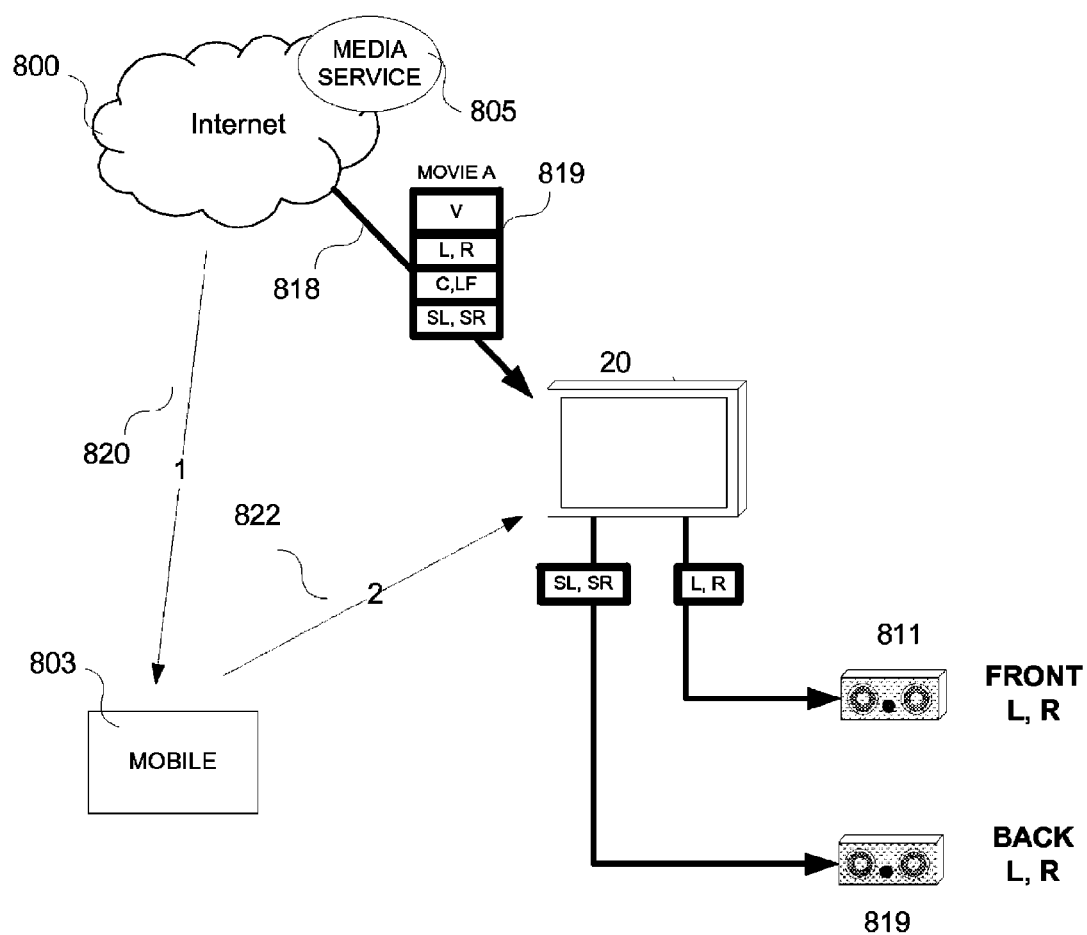
FIG. 5 illustrates the use of a mobile device to select the media to be played and the media components being sent to multiple destination devices.

FIG. 5 shows a system that accommodates a more complicated extension of the scenario shown in FIG. 4, which is more technically challenging. In this system the media components are rendered on different devices.

The systems shown in FIG. 5 and later are the subject of this invention and are part of this invention as described in the following sections.

In the system of FIG. 5 there is a primary device such as a SmartTV 20 that receives 818 media 819 from a media service 805 on the internet 800 over an IP network. The SmartTV 20 then renders the video portion of the media on its local screen. It also sends subsets of the audio portion of the media to separate audio rendering devices 811, 819 wirelessly over a Wi-Fi network. It sends the Front Left and Right audio to a Front audio rendering device 811 and then Surround Left and Right audio to a Back audio rendering device 819.

As in the previous scenario, the user selects the media to be played on a mobile device 803 by receiving 820 information 1 on the media available from the internet 800 media service 805 and instructing 822, 2 the primary media rendering device 20, which is a media destination, to request and receive 818 the media.

Figure 6:
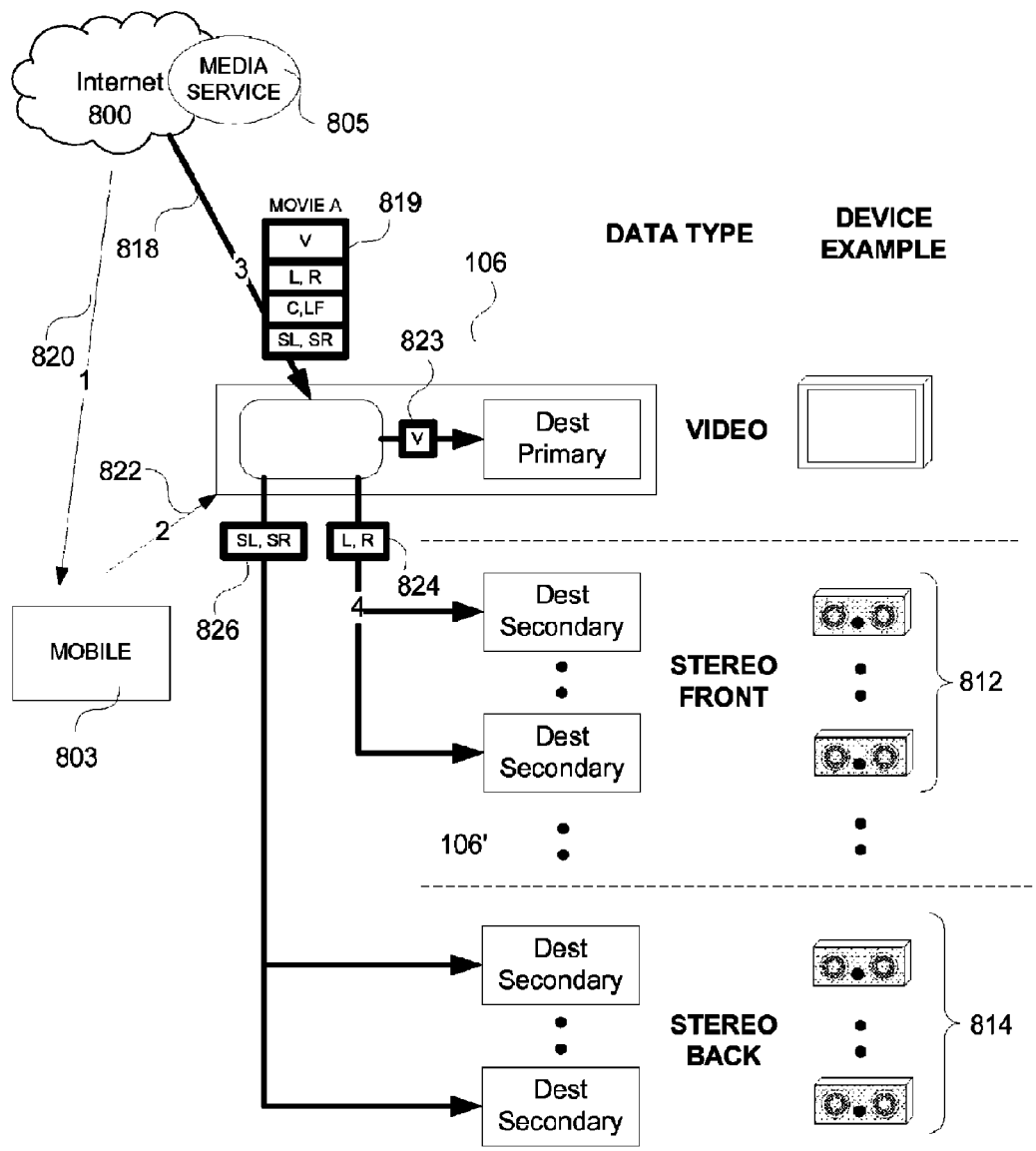
FIG. 6 illustrates an embodiment of using a mobile device to select the media to be played and the media components being sent to multiple destination devices of multiple types.

FIG. 6 shows the most general system of this invention. This consists of a mobile device 803, the internet 800 with media services 805, a primary destination 106 and zero or more secondary destinations 106' all networked together.

The user selects the media to be played on the mobile device 803 by receiving 820 information 1 on the media available from a media service 805 on the internet 800 and instructing 822 the primary media rendering device 106 to request and receive 818 the media 819.

In an alternative embodiment the media and media service 805 may reside elsewhere including on the local network 120 (see FIG. 7), on the mobile device 803 or another computer on the network. The media service includes any type of media service, server or application that can provide any type of media. This includes internet media services such as Netflix or Spotify and DLNA™ media servers. DLNA is a trademark of the Digital Living Network Alliance that defines standards for products that are DLNA compliant. This also includes media server applications such as Windows Media Player™ (Windows Media Player is a product and trademark of Microsoft Corporation) or iTunes™ (iTunes is a trademark and product of Apple Inc.).

The media 819 has multiple, time related, media components, such as video and multi-channel audio (L—Left, R—Right, C—Center, LP—Low Frequency, SL—Surround Left, SR—Surround right) in it. A media component can also be any combination of the components described above, including all the components in the media. A media component can also be other types of media such as imaging media (photographs etc.) or metadata (such as album art or info etc.) or other data that needs to be rendered, presented or output in some manner.

The media 819 also has media positions associated with it, such as a beginning position, various internal positions, frame positions (indexes or offsets) and an end position. These media positions are used to create media event information. A start media event is the association of a media starting position with a time to start the event at. This event information is part of media rendition information.

In the system shown in FIG. 6, the primary media rendering device 106 only renders the video portion (component) 823 of the media and sends other portions of the media to other devices for rendering. In this case, it sends the L, R portion (component) 824 of the media to multiple stereo front rendering devices 812 and it sends the SL, SR portion (component) 826 of the media to multiple stereo back rendering devices 814. What this means is that each media component type is sent to one or more destination rendering devices that handle that media component type.

An example of the system would be where the primary destination device 106 is a SmartTV that is instructed to receive music from an internet media source 800, such as Spotify 805, and to play this music on multiple Wi-Fi connected audio devices 812 in the living room, dining room and kitchen.

Figure 7:
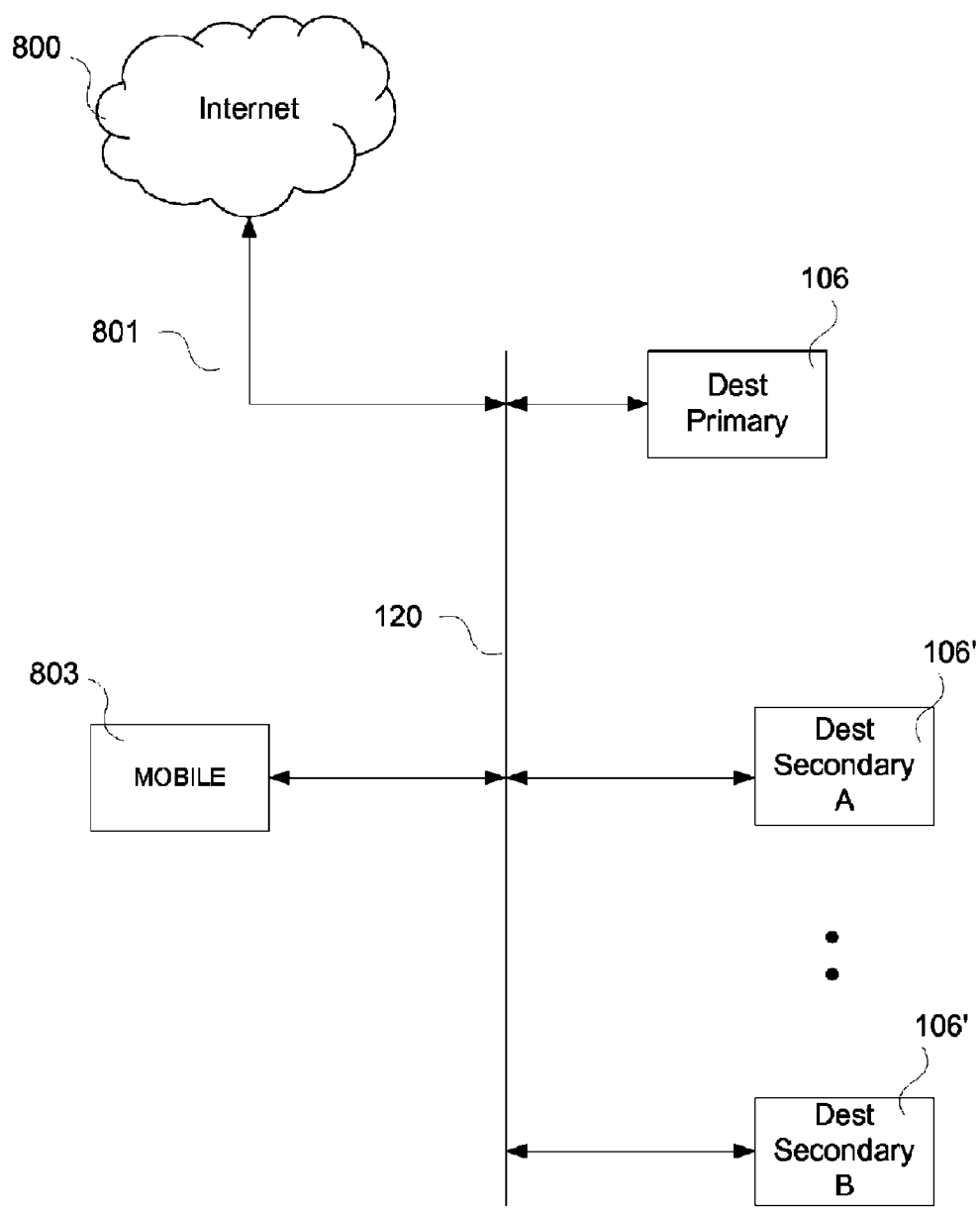
FIG. 7 illustrates one embodiment of the overall network architecture of the applications in this invention.

In this system all devices, as shown in FIG. 7, the mobile device 803 and all destination devices 106 and 106' are networked together on a local network 120. This is an IP network and may be a wired or a wireless (e.g. Wi-Fi) network. This local network is also connected 801 to the internet 800.

Figure 8:
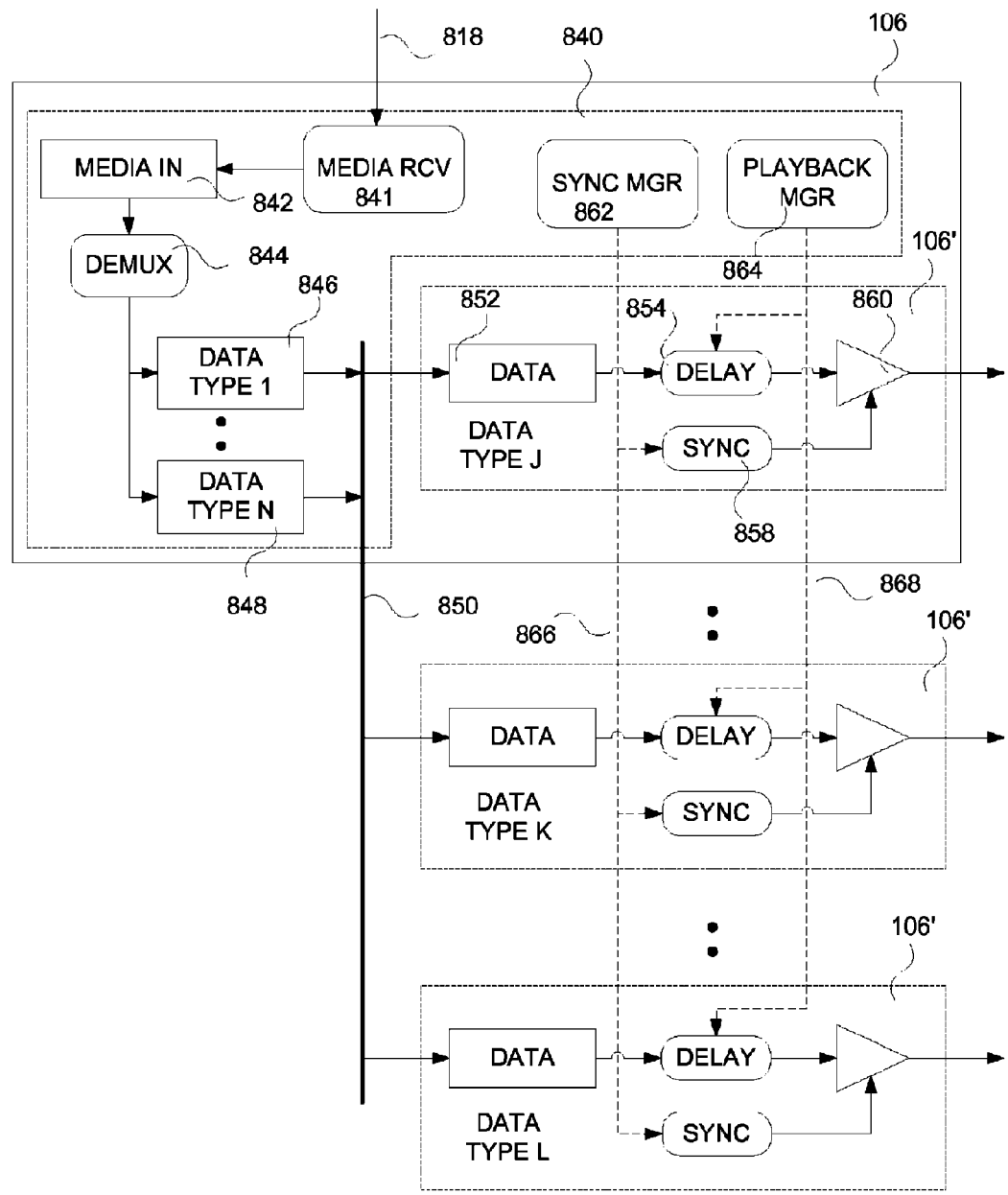
FIG. 8 illustrates the detailed components in the general case of using a mobile device to select the media to be played and the media components being sent to multiple destination devices of multiple types.

FIG. 8 shows the detailed design of this invention for the system described above in more detail. It consists of a primary media destination 106 and zero or more secondary media destinations 106'.

The primary media destination 106 contains both a media manager 840 and a media rendering subsystem 106'. Each media rendering subsystem 106' takes data of a type that corresponds to one media component, referred to as a media component data type.

The media manager 840 contains a media receiver 841, a buffer 842 for receiving incoming media data, a media demultiplexer 844 and one or more media component data buffers 846, 848, one for each media component data type that can be received by the media rendering subsystems 106'. The media manager 840 also contains a synchronization manager 862 that is responsible for synchronizing the rendering clocks, in the synchronization and clocking component 858 in each of the media rendering subsystems 106' at each of the destinations 106, 106'. In addition the media manager 840 contains a playback manager 864 that sets and manages rendition information including media events, such as the rendition (playback) start time and adjusts the playback delay 854 at each of the media rendering subsystems 106'.

The media receiver 841 receives media 818 from a media service. It can receive media from a media service in a variety of forms. It includes a streaming media client to receive streaming media. It is able to read media from network media files on the network. It includes a DLNA client or renderer that can receive media from a DLNA server. The media receiver 841 can receive media in any form and can both pull media to it and can receive media pushed to it from any device including a mobile device.

In the pull mode, the media receiver 841 is notified of what media to retrieve and the media receiver 841 retrieves the media from the media server. For example the media receiver 841 may be notified of a youTube link to access, which it will then access via an HTTP access to YouTube™ to retrieve the media. YouTube is a registered trademark and service of YouTube LLC. HTTP (Hypertext Transfer Protocol) is a standard coordinated by the Internet Engineering Task Force.

In the push mode, the media receiver 841 is waiting for data that is pushed to it by a network application. This may be a media server or other type of client application that can push media to the media receiver 841. The media receiver 841 can receive such push media by listening for a TCP connection or receiving media on a UDP port number. UDP, User Datagram Protocol, is a protocol in the Internet Protocol Suite.

During receipt of incoming media 818, the demultiplexer 844 separates the media contained in the incoming media into the media components required by each media component data buffer 846, 848. If the demultiplexer 844 cannot provide the media component required by a media component data buffer 846, 848, it does not provide that buffer 846, 848 with any data.

The output of the demultiplexer is in the form of a media component data type that can be taken by each media rendering subsystem 106'. This output may be a media component data type of any form taken by the media rendering subsystem 106', including audio data in 16 bit stereo 44.1 KHz PCM (Pulse Code Modulated), 16 bit single channel (e.g. Left or Right or Surround Left or Surround Right or Center of Low Frequency) 44.1 KHz PCM, stereo MP3, H264 video with both audio and video components; H264 video with just the video component etc.

The media 818 received by the demultiplexer via the media receiver 841 comes in many forms. The media may be in a container format that may also be coded and may be compressed. For example a stereo MP3 file will be compressed and coded according to the MP3 standard. To demultiplex this into Left channel PCM, requires the demultiplexer to decompress/decode the MP3 media into stereo PCM media and then separate out the Left Channel PCM data from the Stereo PCM data. Similarly if the media received is a multimedia 5.1 H264 video file, and the demultiplexed outputs need to be H264 video only and single channel audio PCM, then the demultiplexer first separates the multi-channel 5.1 H264 video file into just the H264 video and multi-channel audio subcomponents and then decodes/decompresses the multichannel audio subcomponent into multi-channel 5.1 PCM audio which is then further separated into single channel audio PCM. The demultiplexer therefore includes a decoding/decompression element appropriate for the types of media the system can handle. For additional types of media the system includes the appropriate coder/decoders that are needed in the system.

During a destination device discovery process that occurs during primary media destination startup and periodically during operation, the media manager 840 creates the media component data buffers 846, 848, based on the discovery of media rendering subsystem 106' in the system and the media component data type taken by each media rendering subsystem 106' in each destination 106, 106'. In this process each media destination 106' is associated with one media component data buffer 846, 848 that holds a media component data type that is the same as the media component data type taken by the destination 106'. Note that a media component is any component of the media including all the media.

Each media rendering subsystem 106' contains a receive data buffer 852 to receive the media component data, a media rendering component 860, a media delay component 854 and a synchronizing component 858. The synchronizing component 858 receives synchronization information 866 from the synchronization manager 862 and clocks the media output of the synchronizing component 858. The delay component 854 receives delay information and rendition information 868 from the playback manager 864 and delays and starts the rendition of media as instructed by the playback manager 864 and rendition information sent by it.

As media comes 818 to the media manager 840 the media data is demultiplexed and put into the media component data buffers 846, 848. The media in these buffers 846, 848 are then sent to the destinations 106, 106'.

Media data is sent from each media component data buffer 846, 848 to the set of media destinations 106, 106' associated with the media component data buffer by multi casting the data to the set of media destinations 106', as they all use the same data. The data may also be unicast to the set of media destinations 106' associated with each media component data buffer 846, 848. Unicasting the data may be used when transport latency needs to be kept low or when the media component data types used by the media destinations 106' are all different.

For example, when the system is a 5.1 Home theater system, the system will consist of a video device and 6 audio devices that each take a Left, Right, Surround Right, Surround Left, Center and Low Frequency devices. Therefore this system does not have two devices that take the same media component. All the media destinations 106' take a different media components. In this case there is no advantage in multicasting the media data to the media destinations 106' and the media data is unicast to each media destination 106' instead. The unicast transmission when done over Wi-Fi is more reliable than multicasting, as each Wi-Fi packet is acknowledged and retransmitted if needed by the Wi-Fi physical layer devices. Further the maximum multicast bandwidth is limited by the Wi-Fi protocol, while unicast bandwidth is not.

Synchronization of media rendered by each destination 106, 106' is performed by creating a virtual global clock at each destination. This virtual global clock can be created in a number of ways, including the use of techniques or parts of techniques as described in U.S. patent application Ser. No. 11/627,957, Titled "Streaming Media System and Method", which is incorporated by reference. This patent application describes a method for synchronizing the rendering of media by multiple destinations, by using a technique of measuring and adjusting local clocks at each destination. This uses a synchronization mechanism module that can convert any clock value at a destination N to a destination 1 clock based value. Since any destination clock can be related to destination 1's clock, destination 1's clock can be used as a virtual global clock for all destinations. I.e. any destination can at any time compute the current destination 1's clock value and so it can use this destination 1's clock as a global clock. In the referenced patent application, the synchronization module may reside at the media source or on some other device, including a media destination. In an alternate embodiment, an alternative synchronization mechanism may be used to provide a global clock value that can be used by each destination.

In this embodiment, the synchronization manger resides in the media manager 840. This synchronization manager 862 keeps all destinations synchronized and thus creates a virtual global clock that can be used at each destination.

The playback manager 864 sends rendition information including media events to the media rendering subsystem 106'. This rendition information is created and sent to the media rendering subsystems 106' before the media 818 is demultiplexed and the media components are sent to the media rendering subsystems 106'. Each media event is typically an association of a media position with a virtual global clock value. An example of a media event is the media start event. The media start event, consist of the starting position of the media and a virtual global clock time at which this starting position should be rendered. The media rendering subsystem 106' then uses this media start event in the rendering information to start rendering the media when the virtual global clock time reaches the clock value in the media start event.

The playback manager 864, as shown in FIG. 8, delays the start of rendition of media at all the media rendering subsystems 106' by a fixed delay with respect to incoming media into the buffer 842. This delay is long enough to allow the media data to get from the demultiplexer 844 and media component type buffers 846, 848 over the network 850 through to each media rendering subsystem 106' data buffer 852 and media rendering component 860. The playback manager 864 does this by setting the clock value in the media start event, of the media rendition information, to a value that is a fixed delay in the future with respect to the time at which the media rendition information is created.

Figure 9:
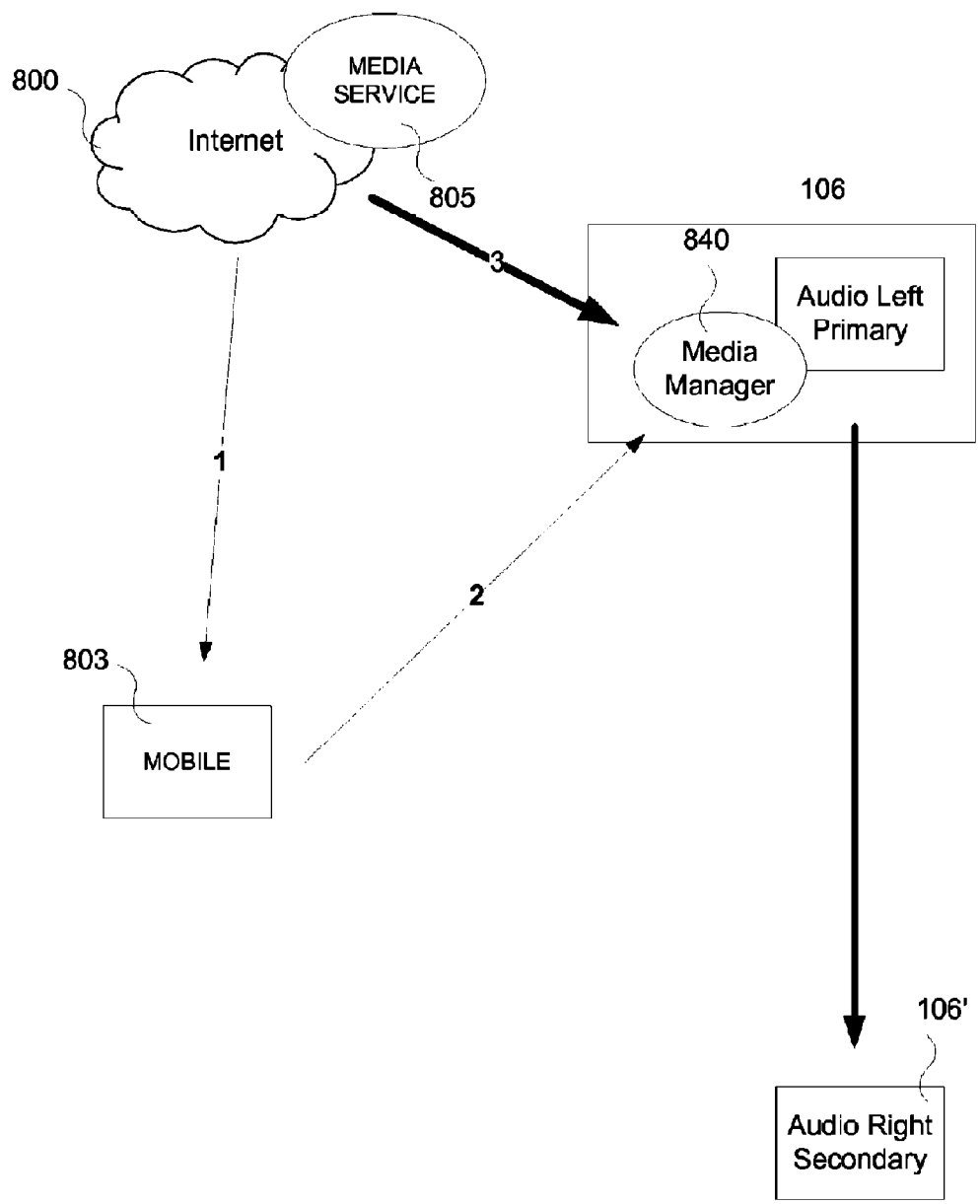
FIG. 9 illustrates an embodiment of two audio devices.

FIG. 9 shows an embodiment of this invention with only two destinations 106, 106'. They are audio devices, such as two speakers. In this case, one of them acts as the primary device 106 and contains the media manager 840. As an example, the user of the mobile 803 device can select to play music from 1 an internet 800 based music service 805 such as Spotify and a specific song from the service. The mobile 803 application will notify the media manager 840 on the primary device 106 to play Spotify and the specific song via a message shown as message 2. The media manager 840 independently accesses the Spotify music service and gets the media via link 3. The media manager 840 will then send the media to the media rendering subsystems on the two media destinations 106, 106', one being on the device it is running on (Audio Left Primary) 106 and the other being on a second device 106' marked as (Audio Right Secondary).

Figure 10:
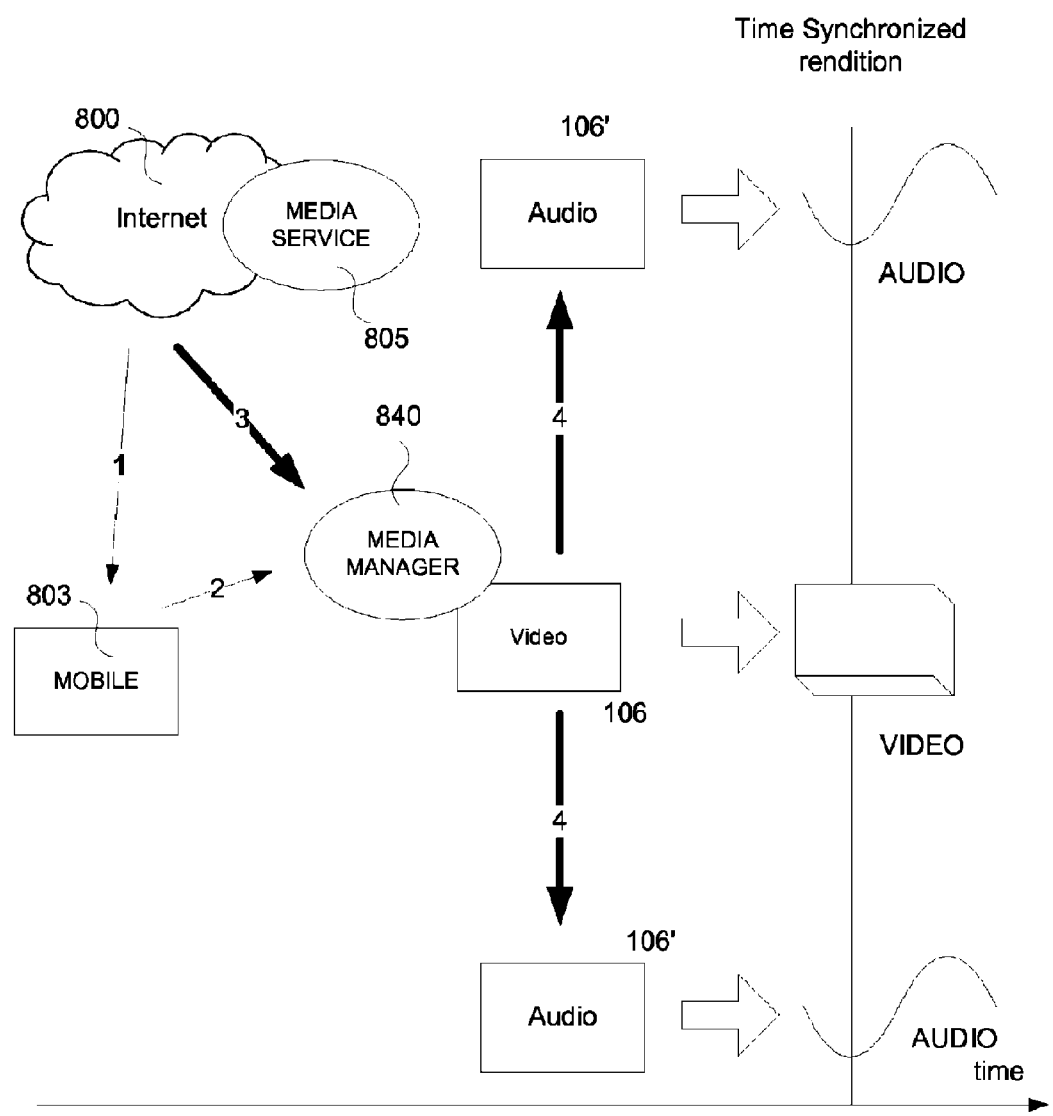
FIG. 10 illustrates an embodiment of one video device and two audio devices.

FIG. 10 shows a further embodiment of this invention where the system includes two audio rendering destinations 106' and a video rendering destination 106. The mobile 803 device user selects media from 1 an internet 800 media service 805, such as a Netflix movie to play. The mobile 803 application sends this information 2 to the media manager 840 running on the primary destination devices 106—the video destination in this case. The media manager 840 independently gets 3 the media from the internet 800 media service, and splits it into a number of media component streams. The video component stream is played by a video destination device 106 where the media manager 840 is located. The audio component streams are sent to the remote audio destination devices 106'.

The synchronized playback of the audio and video media is managed by the synchronization module in the media managers as described above. Both the audio and video playback rendering is set to start at the same time by the playback manager in the media manager 840 and the Delay component in each destination 106, 106'

Figure 10A:
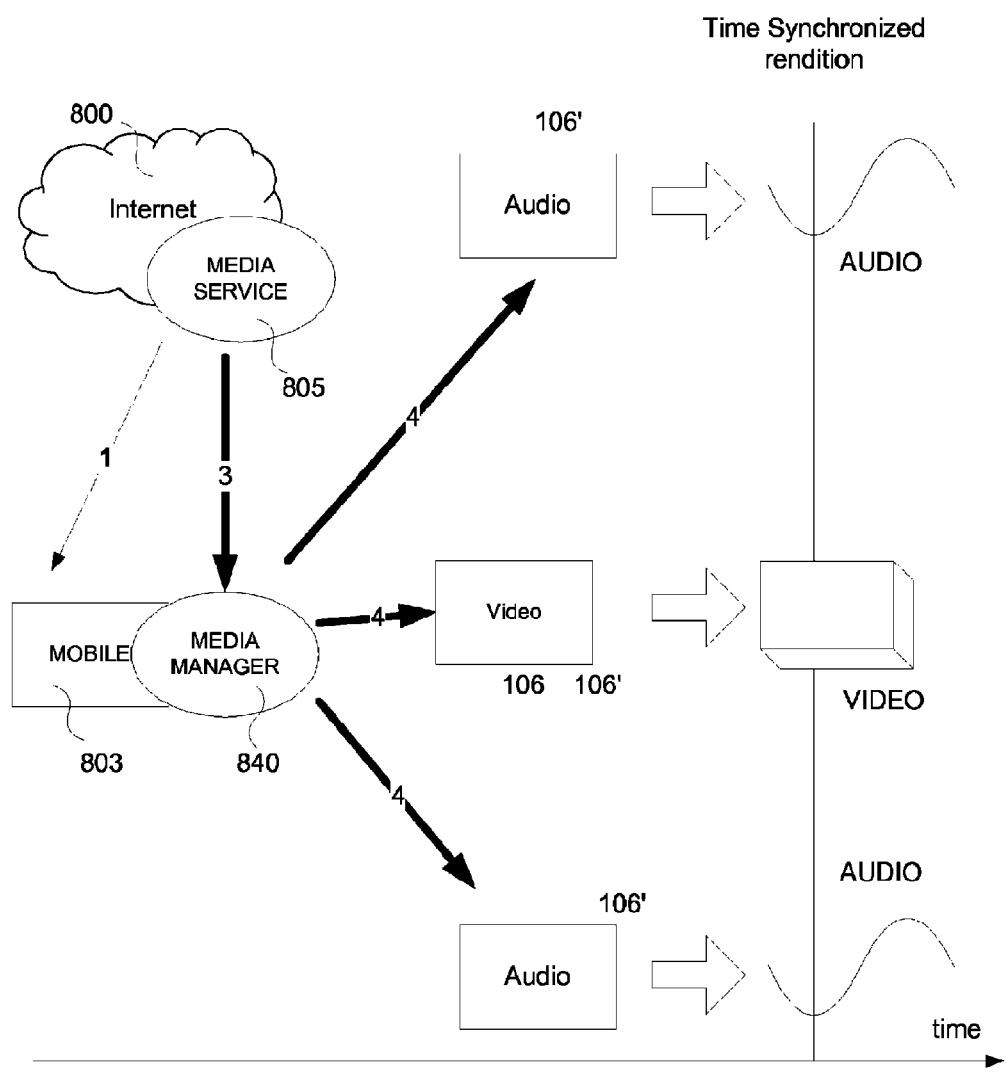
FIG. 10A illustrates an alternate embodiment of one video device and two audio devices.

FIG. 10A shows a further embodiment of this invention where the system includes two audio rendering destinations 106' and a video rendering destination 106'. In this case the media manager 840 is not located at a destination, but instead is located at the mobile device 803. The media manager 840 receives or gets media from a media service 805 located on the Internet 800 and sends 4 the media components to the media rendering subsystems 106' at each destination. The mobile 803 device user selects media from 1 the internet 800 media service 805, such as a Netflix movie to play. The mobile 803 application provides this information to the media manager 840. The media manager 840 gets or receives 3 the media from the internet 800 media service 805 and demultiplexes the media it into a number of media components as described previously. The video component is sent to and rendered by the video media rendering destination device 106'. The audio media components are sent to the audio media rendering destination devices 106'.

Further as described previously, the media service 805 may be located anywhere in the system, including the local network 120 (see FIG. 7) or the mobile device 803. In addition the media manager 840 may access the media directly on the system it is running on. For example if the media manager 840 is located on the mobile device 803 it may access media files that are located on the mobile device 803 or on a computer on the same IP network.

In an alternate embodiment the media manager 840 may be located on any computing device connected to the local network 120 (see FIG. 7) or the internet 800.

In a further embodiment, the sync manager 862 (see FIG. 8) part of the media manager 840 may be located on a primary media destination 106, while the rest of the media manager 840 may not be located on a media destination 106', 106. In this case the media destinations 106, 106' are kept synchronized together by a primary media destination 106, while the media components come from a device that is not a media destination 106, 106'.

1. Synchronizing Independently Remotely Received Media

Figure 11:
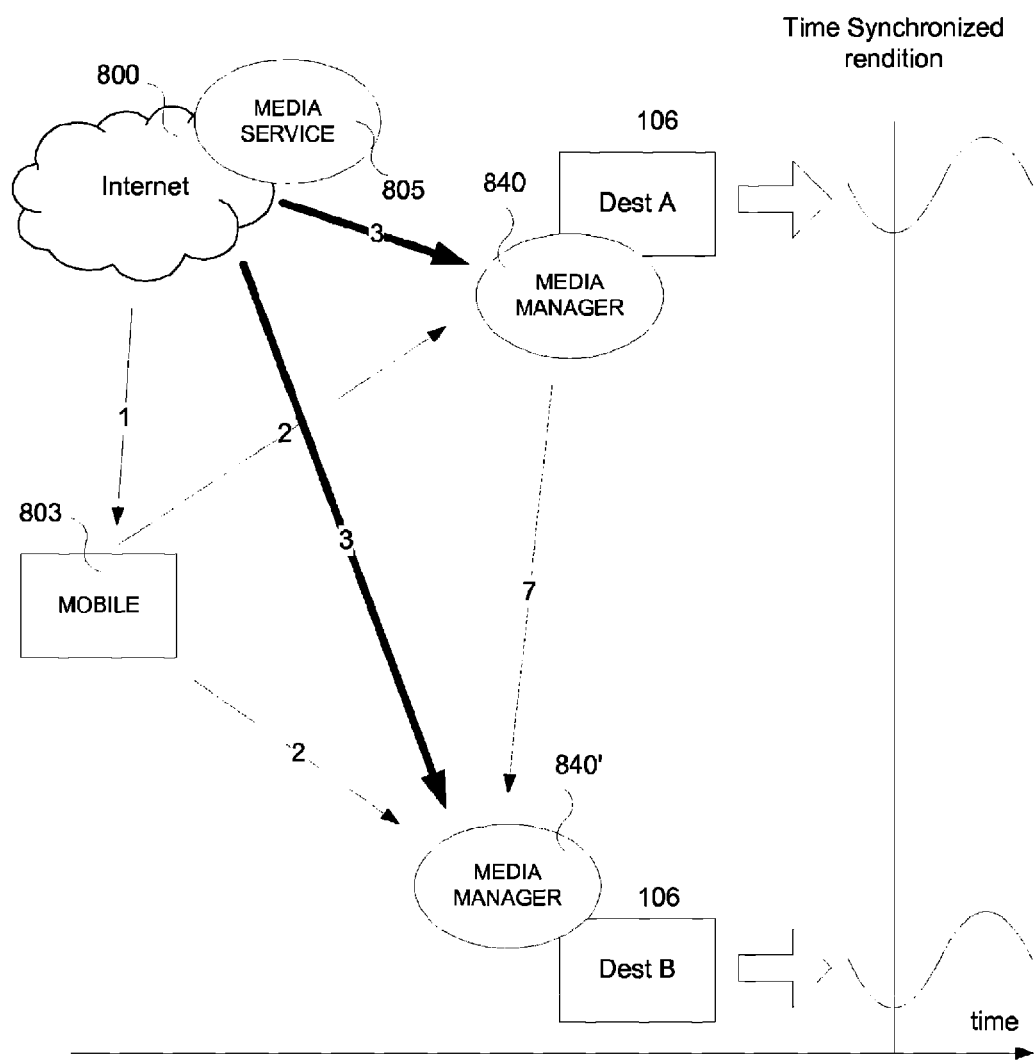
FIG. 11 illustrates an embodiment of two destination devices each receiving media directly from the media source.

FIG. 11 shows a system in an alternate embodiment of this invention for playing media at multiple destinations. In this embodiment, again as above, the user selects 1 media for remote play on the destinations 106 using a mobile 803 device. Each destination device 106 contains a media manager 840, 840'. When the user selects media for playing, messages are sent, via link 2, to all the media managers 840, 840' in all the destinations 106. Each media manager 840, 840' then independently retrieves the media 3 for rendering from the media service 805 on the internet 800.

One of the media managers 840 is selected as the primary media manager. This is done by each media manager communicating with the other and the media manager with the lowest IP address being selected as the primary media manger. In other embodiments other criteria can be used to select the primary media manager.

The primary media manager 840 contains an active synchronization module that synchronizes the virtual global clocks on each destination device as described above. The primary media manager 840 also sets and manages rendition information and notifies all media managers 840, 840' of this rendition information, as shown with links 7. Rendition information includes key events in the media, such as the start event, which consists of the association of the start position of the media, with a specific virtual global clock time. In general the virtual global clock times used are offset a few milliseconds to a few seconds in the future to allow this information to be sent to each media manager in advance of the media event.

Each media manager 840, 840' then manages the rendition of the media in accordance with this rendition information. For example, when the virtual global clock time reaches a value associated with the start media event, the media managers 840, 840' initiate rendition of the media.

For example, on receipt of notification to render a media song, the primary and secondary media manager both request media for that song from the media service and will receive the media and store it in its buffers 842, 846, 852 (See FIG. 8). The first piece of media data, at the start position of the media to be rendered, will pass through to the media rendering subsystem buffer 852 and will be waiting to be rendered by the media rendering component 860. In parallel, at the same time the primary media manager received notification to play a song; it creates a start event by associating the first piece of media data at the start position of the media with a virtual global clock value 100 milliseconds in the future and sends this information to the secondary media manager. The playback manager 864 in the primary media manager and in the secondary media manager then use this information to wait for the start event, by waiting until the virtual global clock value reaches the virtual global clock value in the start event. By this time, media data will have reached the rendering subsystem buffer 852 and will be waiting to be rendered. Once this time is reached, each media rendering subsystem initiates media rendering and continues to render media by the media rendering component 860. In this way, both destinations start rendering the media synchronously, even though they each received the media independently from the media service.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of methods and symbolic representations of operations on information. These descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein.

The present invention is well suited to a wide variety of computer network systems over numerous topologies. Within this field, the configuration and management of large networks comprise storage devices and computers that are communicatively coupled to dissimilar computers and storage devices over a network, such as the Internet, public networks, private networks, or other networks enabling communication between computing systems.

The applications this invention are directed at that may be described above and any objects of this invention that are described above do not fully describe all the applications and objects of this invention and these descriptions are not intended to be limiting in anyway or manner.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system for media playback of media to media rendering devices, comprising:
   a media service configured to communicate with a communication network and to receive media to be rendered, the media comprising a plurality of media components drawn from a set consisting of video, audio, and image media components;
   wherein the media service computing device separates the media into a first media component and a second media component, the first media component being of a different type than the second media component;
   a primary media rendering device having a means to render the first media component and adapted to communicate with the communication network; and a plurality of one or more secondary media rendering devices having a means to render the second media component and adapted to communicate with the communication network;

wherein the media service sends the first media components to the primary media rendering device and sends the second media component to the secondary media rendering devices over the communication network; and wherein the primary media rendering device and the secondary media rendering devices each receive a start rendering event clock time, whereupon each starts rendering the respective received media component when a clock time value reaches the value in the start rendering event clock time.

2. The system of claim 1, further comprising a mobile device adapted to communicate with the communication network;

wherein the mobile device comprises a mobile media application that displays media available for playback from an Internet media service and sends information about the selected media to the media service.

3. The system of claim 1, wherein the media service places the first media component into a first media data type buffer and the second media component into a second media data type buffer; and wherein the primary media rendering device is associated with the first media data type buffer and the secondary media rendering devices is associated the second media type buffer.

4. The system of claim 3, wherein the data in the second media data type buffer is sent to zero or more secondary media rendering devices; and wherein the data is sent in the form of packets and each packet is multicast to each secondary media rendering destination.

5. A system for media playback of media containing multiple media components to media rendering devices, comprising:

a media service adapted to communicate with a communication network and capable of storing media and delivering media over the communication network, the media comprising a plurality of media components drawn from a set consisting of video, audio, and image media components;

a primary media rendering device capable of rendering a media component, and adapted to communicate with the communication network; and a secondary media rendering device capable of rendering a media component, and adapted to communicate with the communication network;

wherein the primary and secondary media rendering devices receive notification of a set of media to be rendered and request the set of media from the media service;

wherein the primary and secondary media rendering devices have access to global clock values that are synchronized to each other;

wherein the primary media rendering device associates the start of the media with a clock value and notifies the secondary media rendering device of the clock value; and wherein the primary and secondary rendering devices initiate rendering the media component when the global clock value reaches the clock value associated with the start of the media.

\* \* \* \* \*